US012320477B2

(12) United States Patent
Stocker et al.

(10) Patent No.: US 12,320,477 B2
(45) Date of Patent: Jun. 3, 2025

(54) LUMINAIRE

(71) Applicant: RHEINMETALL SOLDIER ELECTRONICS GMBH, Stockach (DE)

(72) Inventors: Rolf Stocker, Stockach (DE); Maria Höntsch, Pfullendorf (DE); Alexander Gaisser, Aach (DE)

(73) Assignee: RHEINMETALL SOLDIER ELECTRONICS GMBH, Stockach (DE)

( * ) Notice: Subject to any disclaimer, the term of this patent is extended or adjusted under 35 U.S.C. 154(b) by 0 days.

(21) Appl. No.: 17/922,899

(22) PCT Filed: Mar. 25, 2021

(86) PCT No.: PCT/EP2021/057694
§ 371 (c)(1),
(2) Date: Nov. 2, 2022

(87) PCT Pub. No.: WO2021/223936
PCT Pub. Date: Nov. 11, 2021

(65) Prior Publication Data

US 2023/0167953 A1 Jun. 1, 2023

(30) Foreign Application Priority Data

May 6, 2020 (DE) ..................... 10 2020 112 237.3

(51) Int. Cl.
*F21K 9/65* (2016.01)
*F21L 4/02* (2006.01)
(Continued)

(52) U.S. Cl.
CPC ................ *F21K 9/65* (2016.08); *F21L 4/025* (2013.01); *F21L 4/027* (2013.01); *F21V 23/04* (2013.01);
(Continued)

(58) Field of Classification Search
CPC ............. F21K 9/65; F21V 23/04; F21L 4/025
See application file for complete search history.

(56) References Cited

U.S. PATENT DOCUMENTS 6,979,104 B2 * 12/2005 Brass ................ G01N 21/8803
362/244
9,115,876 B1 * 8/2015 Mart ....................... F21V 29/67
(Continued)

FOREIGN PATENT DOCUMENTS

EP 3486549 A1 5/2019

OTHER PUBLICATIONS

International Search Report issued on Jul. 9, 2021, in connection with the international application No. PCT/EP2021/057694 from the European Patent Office.

*Primary Examiner* — William N Harris
(74) *Attorney, Agent, or Firm* — Christopher M. Scherer; DeWitt LLP

(57) ABSTRACT

The invention relates to a luminaire comprising a housing, at least two radiation sources and at least one directing means. The directing means is used to direct the emission of electromagnetic radiation emitted by the radiation sources. According to the invention, the radiation sources are all located in the center of the directing means such that the radiation sources are arranged concentrically with respect to one another. The radiation sources can be switched on and off individually, jointly, or in combination. Each radiation source emits electromagnetic radiation within a constant wavelength range when switched on, wherein different radiation sources can emit electromagnetic radiation within different wavelength ranges.

13 Claims, 2 Drawing Sheets

Figure 1:
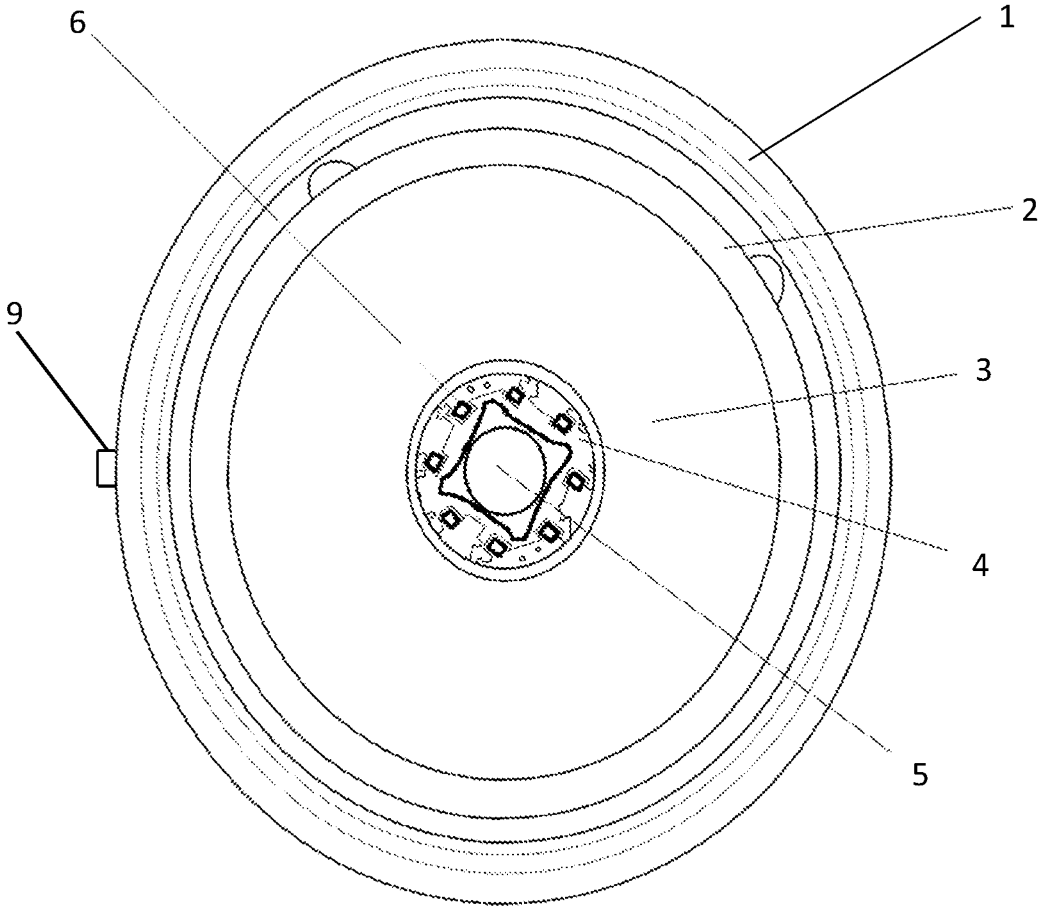

(51) Int. Cl.

| | |
|---|---|
| ***F21V 23/04*** | (2006.01) |
| ***F21Y 113/00*** | (2016.01) |
| ***F21Y 115/10*** | (2016.01) |
| ***F41G 1/34*** | (2006.01) |
| ***F41G 1/36*** | (2006.01) |

(52) U.S. Cl.

CPC ............... *F41G 1/345* (2013.01); *F41G 1/36* (2013.01); *F21Y 2113/30* (2023.05); *F21Y 2115/10* (2016.08)

(56) References Cited

U.S. PATENT DOCUMENTS

| | | | | |
|---|---|---|---|---|
| 10,344,959 | B2 * | 7/2019 | Worman | F21V 19/0035 |
| 10,837,737 | B1 * | 11/2020 | Wright | F41G 1/08 |
| 2005/0157492 | A1 * | 7/2005 | Chiu | F21V 5/006 362/205 |
| 2006/0087842 | A1 * | 4/2006 | Alessio | F21V 14/065 362/235 |
| 2010/0164401 | A1 * | 7/2010 | Matthews | F41G 1/35 362/110 |
| 2012/0139452 | A1 | 6/2012 | Galli et al. | |
| 2012/0176780 | A1 | 7/2012 | Gross et al. | |
| 2019/0145588 | A1 * | 5/2019 | Windom | F21L 4/027 250/504 H |

* cited by examiner

LUMINAIRE

CROSS-REFERENCE TO RELATED APPLICATIONS

The present application is the U.S. National Stage application of International Application No. PCT/EP2021/057694, filed Mar. 25, 2021, which International Application was published on Nov. 11, 2021, as International Publication No. WO2021/223936. The International Application claims priority to German Patent Application No. 10 2020 112 237.3, filed May 6, 2020, the contents of which are incorporated herein by reference in their entireties.

DESCRIPTION

The present invention relates to a luminaire having a housing and at least two radiation sources. Corresponding luminaires are mainly used in the military sector in order to be able to better recognise its target. For this purpose, the luminaires can also be operated independently, but their main field of application is to be mounted on a weapon and thus to be able to illuminate the target of the weapon.

In order to illuminate the target in the best possible way even under different ambient conditions, corresponding luminaires with different radiation sources and a reflector are known for this purpose. For example, a luminaire can have a radiation source that emits infra-red radiation and a radiation source that emits light in the visible range.

In order to activate or deactivate the various radiation sources, it is necessary to put mechanical devices on the luminaire that allow the radiation sources to be switched on and off.

For this purpose, it is known from the prior art to be able to select the radiation source by means of the head of the luminaire. In this case, the head of the luminaire is rotated and, as a result of an eccentric arrangement of the lighting means in the head, the lighting means is activated or deactivated during the rotation of the head.

For this purpose, there are two embodiments, namely a first embodiment in which the rotation of the head effects a repositioning of the reflector, and thus the reflector is positioned centrally over the selected lighting means. In a second embodiment, the rotation of the head effects a repositioning of the underlying board with the lighting means, so that the board rotates into the focus of the reflector in order to select the corresponding lighting means.

For example, it is known from WO 2010/042756 A1 to select the corresponding lighting means by rotating the luminaire head, in the presence of at least two different lighting means.

The problem with mechanical positioning by rotating the head is that the service life of the luminaire is reduced by the mechanical stress.

The object of the present invention is therefore to provide a luminaire that, when the individual lighting means are activated or deactivated, causes the lowest possible mechanical loads on the luminaire, while at the same time using a common reflector for the individual lighting means.

This object is achieved by the features of the main claim.

The invention relates to a luminaire having a housing that contains at least two radiation sources and at least one directing means for the directional emission of the electromagnetic radiation emitted by the radiation sources.

For this purpose, the housing is preferably of elongated design, with a lamp head at one end of the housing, wherein the directing means and the radiation sources are located in the lamp head.

In the following, directing means are understood to be all devices that are capable of directing the emitted electromagnetic radiation from the radiation sources. This can be done, for example, by means of a reflector, but also by means of at least one lens assigned to at least one radiation source or a lens that is common to a plurality of radiation sources. In this case, the lens can be placed directly onto the radiation source, which is appropriate, for example, in the case of LEDs or is spaced apart from the radiation source.

According to the invention, the radiation sources are arranged centrally in the lamp head, so that the directing means can radiate the radiated light from the radiation sources in a directed manner.

The at least two radiation sources are arranged in such a way that they are positioned concentrically to one another. In this case, a first radiation source can consist of a single lighting means that is located in the central point of the lamp head, and the remaining radiation sources can consist of a plurality of lighting means that are arranged in a circle around the first radiation source.

According to the invention, the radiation sources can be switched on and off in such a way that the radiation sources can either be switched on and off together or each radiation source can be switched on and off on its own. It is also conceivable that the radiation sources can be switched on dependently on one another. This means that a predefined radiation source cannot be switched on until another radiation source has been switched on beforehand.

Thus, each radiation source can assume two states, namely a switched-on state and a switched-off state, wherein each radiation source emits an electromagnetic radiation with a constant wavelength range in the switched-on state.

However, the different radiation sources can emit electromagnetic radiation with different wavelength ranges. This means that, for example, the first radiation source can emit light in the visible range and a second radiation source can emit light in the infra-red range.

The embodiment with three different radiation sources is particularly preferred, in which case at least one of the radiation sources is designed in such a way that it can emit thermal radiation, for example in the IR range.

When at least three radiation sources are used, it can be advantageous if the radiation sources are arranged alternately with respect to one another. This means that firstly a radiation source with a wavelength range is arranged in the centre of the lamp head and a second radiation source with a wavelength range different from the first radiation source is arranged around the first radiation source. The third radiation source then again has the wavelength range of the first radiation source and is arranged concentrically around the first and the second radiation source. A possible fourth radiation source would then again be equipped with the wavelength range of the second radiation source and would be arranged concentrically around the first, second and third radiation sources.

Preferably, at least one of the radiation sources is designed to be capped, so that a simple change of the radiation source is possible. Furthermore, the radiation sources are preferably arranged on at least one carrier; for example, a board. Different radiation sources can be arranged on different boards.

The above mentioned embodiments ensure that all radiation sources are located centrally and concentrically around one another in the lamp head and thus the emitted light of the radiation sources can be directed by the directing means. Thus, all radiation sources can be designed without mechanical repositioning of the directing means, of the lamp head or of the carrier.

Preferably, the lamp head can nevertheless be designed to be moved; for example, for focusing the electromagnetic radiation emitted by the radiation sources.

To switch the radiation sources on and off, it is proposed to provide a switching possibility on the luminaire by means of which the radiation sources can be switched on and off.

In the simplest case, the switching possibility can be made possible by a switch or a button.

The switching possibility can be designed in such a way that an actuating element is provided for each radiation source. Likewise, however, the switching possibility can also consist of only a single actuating element, specifically when all the radiation sources are to be switched on and off simultaneously.

The switching possibility can also be designed in such a way that certain radiation sources can only be switched on when other radiation sources have already been switched on.

In a particular embodiment, the luminaire is designed in such a way that optical signal transmission is possible via at least one radiation source. This is possible either by amplitude modulation of the wavelength range emitted by the radiation source or by clocked switching on and off of the corresponding radiation source.

For this purpose, it is proposed that the switching possibility comprises a programmable logic which can carry out the above mentioned amplitude modulation or performs the clocked switching on and off of the corresponding radiation source. The amplitude modulation or the aforementioned switching on and off is preferably operated at a frequency that is not in the visible range.

So that the light can be attached to a weapon, means for fastening to a weapon are preferably provided.

Figure 2:
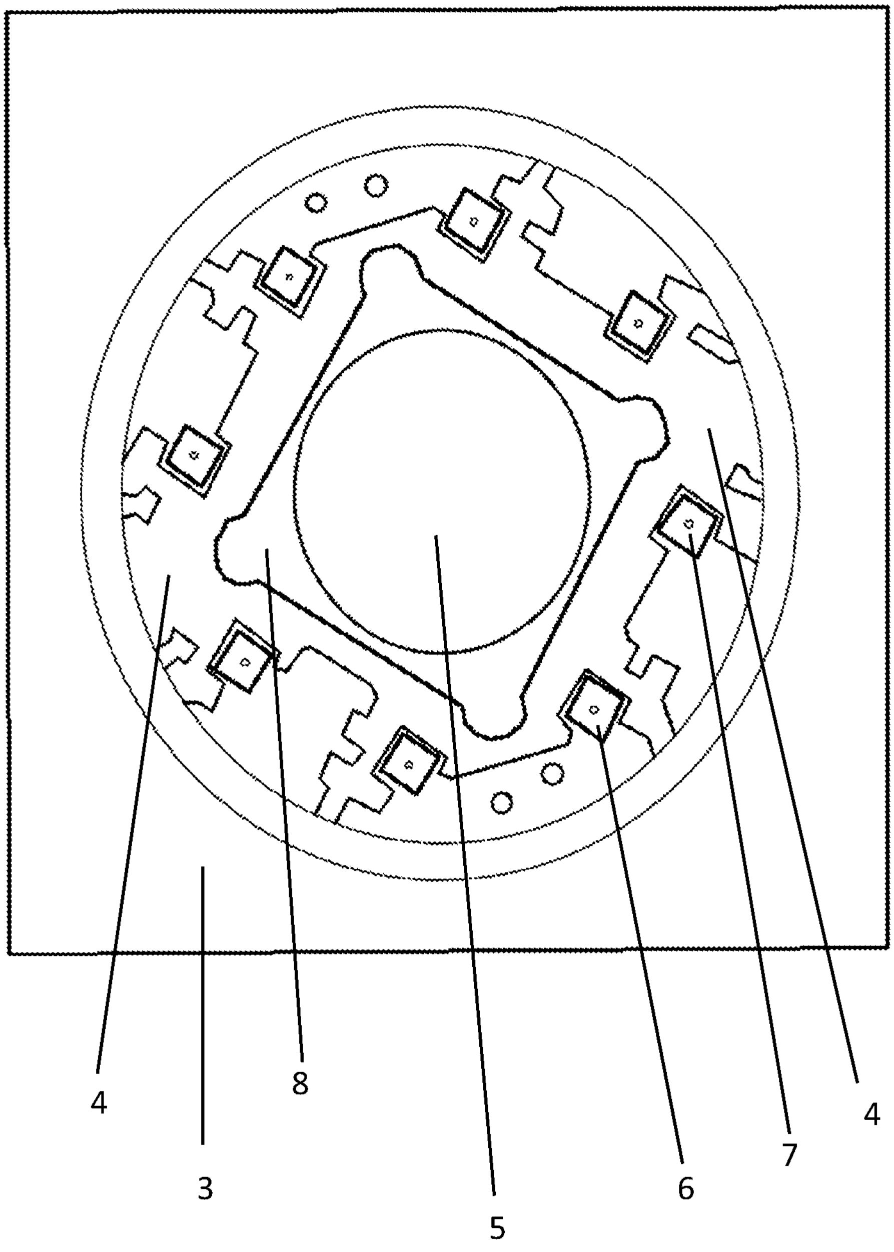

Further features result from the attached drawings. In the drawings:

FIG. 1: shows a directing means of the luminaire according to the invention having two radiation sources;

FIG. 2: shows a detailed view of the carrier of the radiation sources from Figure one.

FIG. 1 shows a reflector as a directing means 3 of the luminaire according to the invention, wherein the reflector is constructed like a truncated cone. The side on which the truncated cone tapers is the position on which the radiation sources 5, 6 are located.

In the present case, the radiation sources 5, 6 are applied to a carrier 4, wherein a first radiation source 5 is arranged centrally, as seen from the directing means 3, and the second radiation source 6 is arranged concentrically around the first radiation source 5. The directing means is preferably arranged in the housing of the luminaire by means of a tolerance compensation 2. In this case, the tolerance compensation can be arranged on a transparent disk of the luminaire head. For this purpose, the tolerance compensation can also act as a seal.

In this embodiment, the enclosure 1 is part of the housing of the luminaire and terminates with the transparent disk.

The directing means 3 ensures the directional emission of the electromagnetic radiation from the radiation sources 5, 6. For this purpose, the reflector can be equipped with a smooth surface that can reflect electromagnetic radiation. Furthermore, it is possible to provide the surface of the reflector with a structure or with retro reflectors. This embodiment makes it possible to influence the emission characteristic of the weapon luminaire.

FIG. 2 shows the arrangement of the radiation sources 5, 6 from the previous figure in detail. For this purpose, it is shown that the radiation sources 5, 6 are arranged on a carrier 4, wherein at least one of the radiation sources 5 is arranged on a base 8.

In this case, the first radiation source 5 is composed of only one lighting means, preferably an LED. In this embodiment, the second radiation source 6 is composed of a plurality of lighting means, in this case four identical lighting means, which are arranged concentrically around the first lighting means 5.

The second lighting means 6 can also be designed as LEDs, preferably from lighting means that emit thermal radiation, for example IR radiation.

More than two different radiation sources 5, 6, 7 are also possible; in FIG. 2, for example, three different radiation sources 5, 6, 7 are shown. The radiation sources 5, 6, 7 are arranged concentrically to one another; in this case, the radiation sources 6, 7 are arranged concentrically to the radiation source 5. The second radiation source 6 and the third radiation source 7 are arranged alternately with respect to one another. The radiation source 7 is also arranged on the carrier 4.

The different radiation sources can in each case be activated or deactivated independently on one another, preferably by means of a switching possibility 9 on the weapon luminaire. Likewise, the radiation sources can be switched on or off dependently of one another.

The present invention is not limited to the above mentioned features, but rather further possible embodiments are conceivable. Thus, the reflector with the radiation sources is preferably accommodated in a lamp head that is rotatably mounted on the luminaire. By rotating the lamp head, however, the radiation source is not selected, as is known from the prior art, but the focusing is changed by changing the distance of the directing means from the radiation sources. Furthermore, radiation sources in the UV range are also conceivable, as well as laser sources for the purpose of target marking.

LIST OF REFERENCE NUMERALS

1. Enclosure
2. Tolerance compensation
3. Directing means
4. Carrier
5. First light source
6. Second light source
7. Third light source
8. Base
9. Switching possibility

The invention claimed is:

1. A luminaire with a housing, comprising:

at least two radiation sources;

at least one switching possibility comprising a programmable logic that can amplitude-modulate at least one of the at least two radiation sources in such a way that signal transmission by at least one of the at least two radiation sources is made possible;

a lamp head; and at least one directing means to direct an emission of the electromagnetic radiation emitted by the radiation sources, wherein the at least one directing means is provided in the form of a lens or a reflector, wherein a first radiation source of the at least two radiation sources is arranged in a centre of the lamp head such that a second radiation source of the at least two radiation sources and a third radiation source of the at least two radiation sources are arranged concentrically with respect to the first radiation source, wherein the second radiation source and the third radiation source are arranged alternately with respect to one another, wherein the second radiation source and the third radiation source can be switched on and off, wherein each of the second radiation source and the third radiation source emits electromagnetic radiation within a constant wavelength range when switched on, wherein the second radiation source and the third radiation source can emit electromagnetic radiation within different wavelength ranges, wherein the first radiation source and third radiation source have the same wavelength range and the second radiation source has a different wavelength from the first and third radiation sources.

2. The luminaire according to claim 1, wherein the first radiation source and the third radiation source emit visible light and the second radiation source emits electromagnetic radiation in the infrared range.

3. The luminaire according to claim 1, wherein at least one radiation source of the at least two radiation sources is arranged on a base.

4. The luminaire according to claim 1, wherein the at least two radiation sources are comprised of at least one LED.

5. The luminaire according to claim 1, wherein the at least two radiation sources can emit light in the visible range.

6. The luminaire according to claim 1, wherein the at least two radiation sources can emit heat radiation.

7. The luminaire according to claim 1, wherein the at least two radiation sources are arranged concentrically and/or alternately with respect to one another.

8. The luminaire according to claim 1, wherein the at least one switching possibility is provided on the luminaire, by means of which the at least two radiation sources can be switched on and off.

9. The luminaire according to claim 8, wherein the at least two radiation sources can be switched on and off independently of one another.

10. The luminaire according to claim 8, wherein at least one of the second radiation source or the third radiation source can only be switched on if the first radiation source is already switched on.

11. The luminaire according to claim 8, wherein the at least one switching possibility comprises at least one switch and/or button.

12. The luminaire according to claim 1, wherein the programmable logic of the at least one switching possibility can switch on or off at least one of the first radiation source, the second radiation source, or the third radiation source in such a way that signal transmission by at least one of the first radiation source, the second radiation source, or the third radiation source is made possible.

13. The luminaire according to claim 1, wherein the at least two radiation sources are arranged on a carrier.

* * * * *